United States Patent [19]

Ferenc

[11] Patent Number: 4,754,375

[45] Date of Patent: Jun. 28, 1988

[54] COMBINATION REFLECTOR FOR WIDE ANGLE WARNING LIGHT

[75] Inventor: Robert A. Ferenc, Middletown, Conn.

[73] Assignee: Whelen Technologies, Inc., Chester, Conn.

[21] Appl. No.: 896,932

[22] Filed: Aug. 15, 1986

Related U.S. Application Data

[63] Continuation-in-part of Ser. No. 579,781, Feb. 13, 1984, Pat. No. 4,620,268.

[51] Int. Cl.$^4$ .............................................. B60Q 1/00
[52] U.S. Cl. ...................................... 362/74; 362/216; 362/346; 362/217; 362/301
[58] Field of Search ................. 362/74, 263, 297, 304, 362/301, 341, 346, 347, 216, 217, 61, 80

[56] References Cited

U.S. PATENT DOCUMENTS

| | | | |
|---|---|---|---|
| 2,424,531 | 7/1947 | Alexander et al. | 362/217 |
| 3,259,739 | 7/1966 | Guth | 362/217 |
| 3,596,237 | 7/1971 | Barber, Jr. et al. | 362/263 |
| 3,610,915 | 10/1971 | Moore | 362/297 |
| 4,261,030 | 4/1981 | Hernandez | 362/263 |
| 4,379,322 | 4/1983 | Kelly | 362/301 |

FOREIGN PATENT DOCUMENTS

795921 1/1936 France .............................. 362/263

Primary Examiner—Ira S. Lazarus
Assistant Examiner—D. M. Cox
Attorney, Agent, or Firm—Chilton, Alix & Van Kirk

[57] ABSTRACT

A light (58, 120) having a first parabolic reflecting surface (62, 122) and a second parabolic reflecting surface (60, 122) joined to the first surface at an angle (62) greater than about 90 degrees. The reflecting surfaces have linear vertexes (130, 132) and focal points (66, 64, 126, 128) which extend along a line parallel to the vertexes. A single elongated gas discharge tube (74) is located substantially coincident with the focal points of the reflecting surfaces. Preferably, the light has third and fourth reflecting surfaces (78, 79, 140, 146) which are angled relative to the first and second reflecting surfaces, and an integral bracket (162) for supporting a different type of light.

14 Claims, 8 Drawing Sheets

Fig. 14

COMBINATION REFLECTOR FOR WIDE ANGLE WARNING LIGHT

CROSS-REFERENCE TO RELATED APPLICATION

This application is a continuation-in-part of application Ser. No. 579,781, filed Feb. 13, 1984 now U.S. Pat. No. 4,620,268.

BACKGROUND OF THE INVENTION

1. Field of the Invention

The present invention relates to warning light systems and particularly to light assemblies for installation on vehicles, especially emergency and other public service vehicles.

2. Description Of The Prior Art

Lighting systems for mounting on the exterior of police and other public service vehicles have long been known in the art. Exterior mounting of such lighting systems is generally preferred in order to enhance visibility. A warning light mounted above the roof of an emergency vehicle may be more readily seen than a light mounted below the vehicle roof line or within the vehicle and such exterior mounting affords the possibility of the emitted light being seen from any direction. Exterior mounting also minimizes the possibility that the light produced by the lighting system will interfere with the vision of the vehicle operator. Further, an exterior mounted lighting system may be designed to perform illumination functions which would otherwise have to be accomplished manually and thus an exterior mounted light assembly may free the vehicle operator's hands and attention for other tasks.

The most popular form of exterior lighting system for emergency vehicles is the lightbar which spans, but is spaced slightly above the top of the vehicle and is supported by the top and clamped to the vehicle rain gutters. Lightbars are desirable because of their ability to provide a wide variety of types of illumination, because they can be installed easily and without major vehicle modifications, and because they can be removed from the vehicle if necessary or desirable. Previously available lightbar assemblies have, however, been characterized by a number of inherent deficiencies. A major deficiency of the prior lightbars has been their impact upon vehicle fuel consumption. Because of their comparatively large frontal area, prior lightbar assemblies had comparatively poor aerodynamic characteristics. Another deficiency of prior lightbar assemblies resided in their inflexibility of design. That is, the construction of prior lightbar assemblies did not permit the user to dictate the characteristics of the device but rather required the user to purchase from a limited number of "standard" models. Yet another disadvantage of previously available lightbar assemblies has been their generally decreased visibility in bright sunlight because of "wash-out" effect resulting from light entering the assembly via the transparent or translucent upper side of the molded plastic housings thereof. Attempts to overcome this "wash-out" effect by applying an opaque coating to the interior of upper portions of the outer housings have not been entirely successful. Still another deficiency of prior lightbar assemblies was their comparatively heavy weight resulting from the type of construction which was required to preven the assembly from sagging in the middle. Prior lightbar assemblies have often also been difficult to service. With regard to servicing, some prior art lightbar assemblies must be disassembled for servicing and any inoperative components painstakingly removed and repaired and the device then reassembled.

Another deficiency in known lightbars is the difficulty of providing full warning light effectiveness on the sides of the lightbar, simultaneously with operation of the so-called "alley" lights.

SUMMARY OF THE INVENTION

The present invention is directed to a novel reflector and light arrangement, particularly well-suited for installation in a lightbar assembly. This novel light provides a wide angle illumination pattern, up to 180 degrees in one embodiment of the invention. These wide angle lights may, for example, be installed at the corners of I-beam type lightbar supports to provide an illumination pattern which wraps around the corners of the lightbar.

In accordance with the invention, the light has a first parabolic reflecting surface and a second parabolic reflecting surface joined to the first surface, at an angle greater than about 90 degrees. The reflecting surfaces have linear vertexes and focal points which extend along a line parallel to the vertexes. An elongated gas discharge tube is located substantially coincident with the focal points of the reflecting surfaces. Preferably, the reflector has third and fourth reflecting surfaces which are angled relative to the first and second reflecting surfaces, the gas discharge tube also being shaped to extend along the focal points of the third and fourth surfaces.

In one embodiment of the invention, the reflector comprises two symmetric reflector sections which are joined together along a centerline, the gas discharge tube having three bends to span the full extent of the reflecting surfaces, such that reflected light is directed over a field of 180 degrees in a substantially horizontal plane.

In another embodiment, the end of one of the parabolic reflecting surfaces has the form of a portion of a parabolic dish, and the end of the other parabolic reflector opposite the dish includes a third parabolic reflector surface and a mounting bracket to which other lights may be attached.

Both embodiments of the wide angle reflector can be used as warning lights on the corners of lightbars for motor vehicles, while permitting simultaneous operation of alley lights mounted in the side portions of the lightbars.

BRIEF DESCRIPTION OF THE DRAWINGS

The present invention may be better understood and its numerous objects and advantages revealed to those skilled in the art by reference to the accompanying drawings wherein like reference numerals refer to like elements in the several FIGURES and in which.

DESCRIPTION OF THE DISCLOSED EMBODIMENT

With reference now to the drawings, and particularly jointly to FIGS. 1-4, a lightbar assembly includes, as the base portion thereof, an I-beam 10. Beam 10 includes a web 12 and upper and lower flanges 14. Beam 10 will preferrably be an aluminum extrusion which, as may be seen from FIG. 3, has thickened flange edge portions in which are formed outwardly opening locking grooves 16. The outer surface of each of flanges 14 is provided, in the thickened edge portions which include the locking grooves 16, with longitudinally extending flat-bottomed channels 18. The flanges 14 of I-beam 10 are also provided, at the interior of the thickened edge portions thereof, with locating grooves 20. Groves 20 are positioned slightly inwardly with respect to the channels 18 and are aligned on the upper and lower flanges. The lower surface of I-beam 10 is additionally provided with a recessed flat surface 19 which extends between a pair of facing mounting slots 21. The grooves 16 and 20, channels 18 and slots 21 extend the length of I-beam 10. The top of I-beam 10 is flat between channels 18 and is parallel to surface 19. The flanges 14 of I-beam 10 cooperate to define therebetween a pair of oppositely opening channels which house, as shall be described in greater detail below, the light sources, reflectors and power supplies of the lightbar assembly.

The lightbar assembly is provided with generally C-shaped elements which may comprise lenses, and/or windows, and/or opaque covers and/or rear illuminated signs. As may best be seen from FIG. 4, which is a cross-sectional view of a C-shaped element 22, these elements are provided, in the parallel oppositely disposed edge regions thereof, with portions 24 which are complementary in shape to the locking grooves 16 and the edge portions of the flanges 14 of I-beam 10 which are disposed to either side of the entrances to grooves 16. The C-shaped elements are mounted on I-beam 10 by insertion from the ends thereof and sliding along the I-beam to the desired position. The shape of the cooperating locking grooves 16 and edge portions 24, and the tight fit therebetween, insures against leakage of moisture to the interior of the lightbar assembly between the C-shaped elements and the flanges 14. The C-shaped elements will, in the case of lens elements such as indicated at 22 in FIGS. 1 and 2, be molded or extruded to impart the desired distribution pattern to light emitted from lamps or flash tubes positioned behind the C-shaped element within the lightbar assembly. The lens elements 22 depicted in FIGS. 1 and 2, for example, have a fluted inner surface defined by spreader optic bands which are separated by flats. These spreaders extend transversely with respect to the flat top and bottom surfaces of the flanges 14 of I-beam 10. The spreaders serve to direct light provided by a light source located behind the lens element within the lightbar assembly in a generally horizontal plane, i.e., a plane parallel to the exposed flat top surface of the I-beam.

Figure 2A:
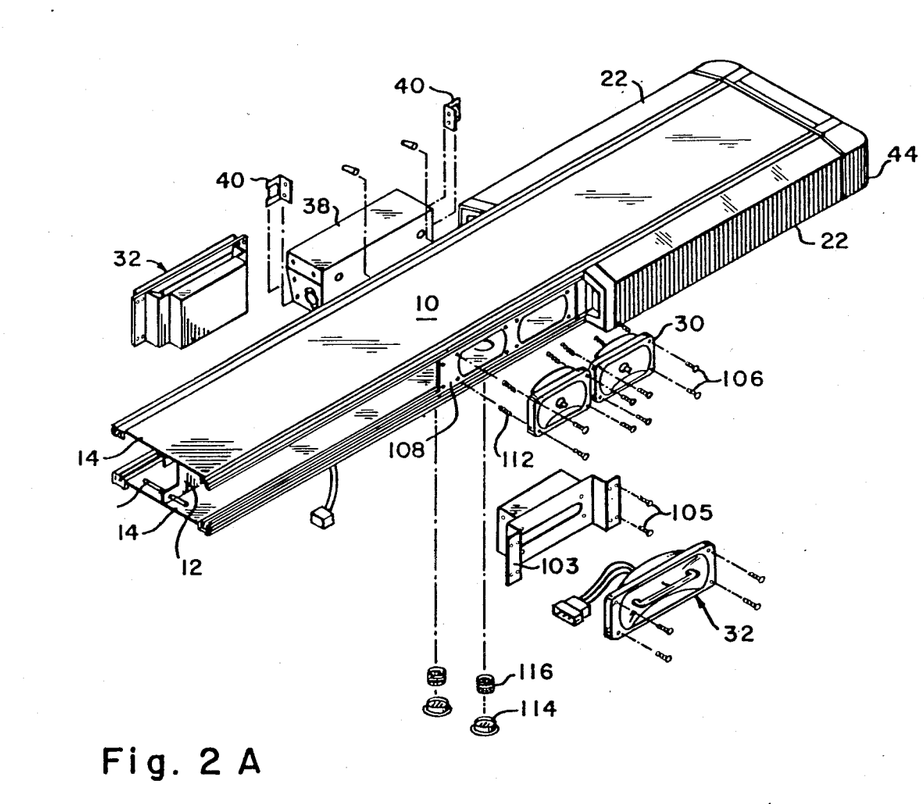
FIGS. 2A and 2B are a partially exploded perspective view of the lightbar assembly of FIG. 1 with the mounting feet removed.
Figure 2B:
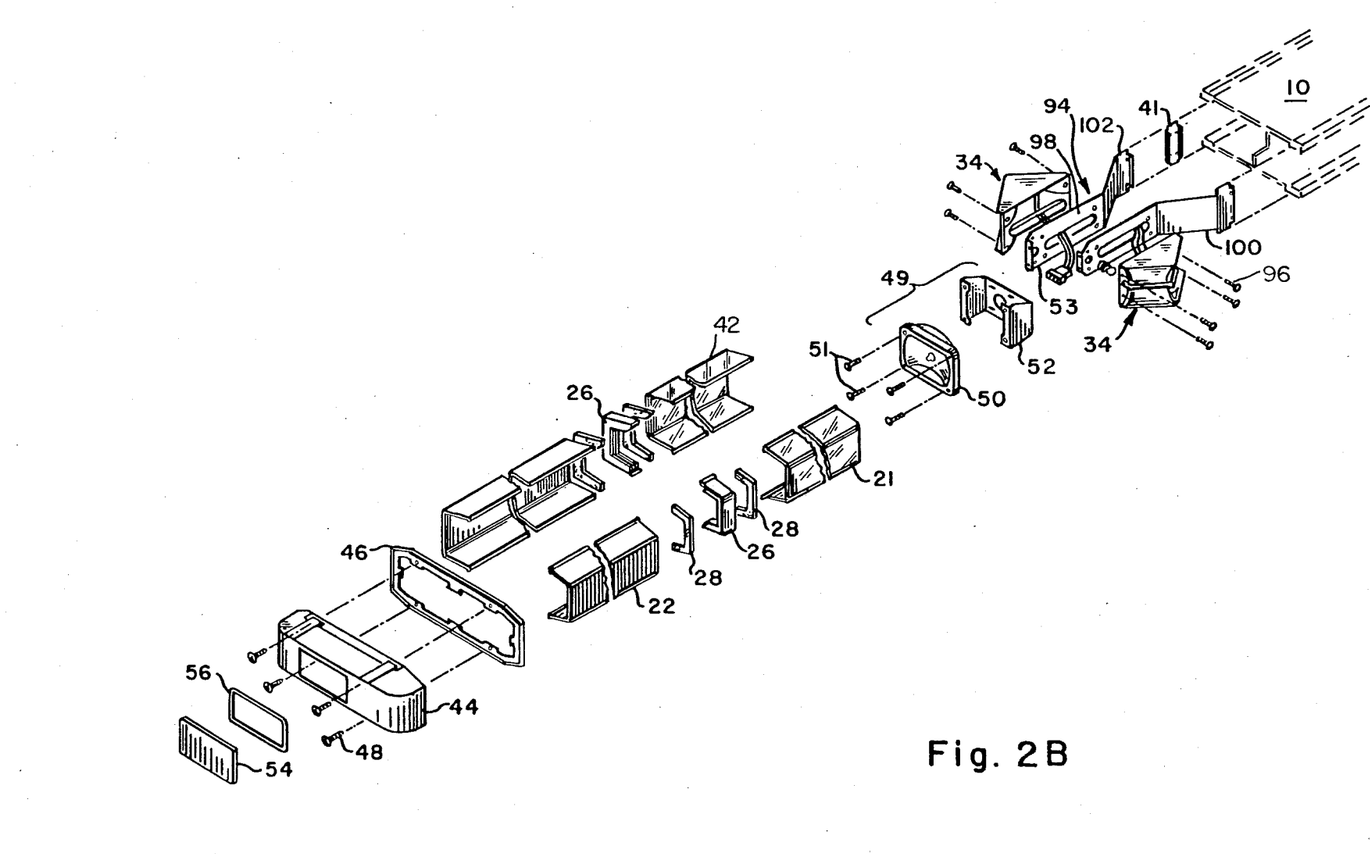

Continuing to refer to FIG. 2, a generally C-shaped divider 26 will be positioned between adjacent of the C-shaped lens elements 22. The dividers 26 are provided with opposite edge portions which are identical in size and shape to the edge portions 24 of the C-shaped elements whereby the dividers can be inserted and captured in the locking grooves 16 in channels 14. Additionally, the dividers 26 may be configured to have oppositely facing grooves in the sides thereof, these side grooves being commensurate in shape with the cross-sectional area of the C-shaped elements. A gasket 28 will be seated in each of the side grooves in each divider 26. When the lightbar is assembled the gaskets 28 will be in contact with, and compressed by, respective facing edges of a pair of adjacent C-shaped elements and these adjacent edges will be over-lapped by forwardly and rearwardly facing portions of a divider 26. Accordingly, because of the over-lapping and the gasketing, a weather-tight seal is provided between adjacent C-shaped elements. The dividers 26 and gaskets 28 function as expansion joints which also compensate for different coefficients of expansion of the I-beam 10 and the plastic C-shaped elements. The gaskets 28 are preferably comprised of a closed cell material, for example a closed cell sponge rubber. Other devices for establishing a weather-tight seal between adjacent lens elements may be employed in lieu of the disclosed dividers and cooperating gaskets.

The lightbar assembly, because of its modular construction, may be assembled in accordance with the user's need or preference of light type and position and lens color and optical characteristics. In the disclosed embodiment the lightbar is provided, at its mid-section, with a pair of "take-down" lights 30 which will typically be halogen lamps and associated reflectors. Lights 30 will function as spot lights and the light provided thereby will be sufficiently intense to make it extremely difficult for a person in the illumination field to determine the precise position of a individual standing rearwardly of the lightbar in the dark. The lightbar assembly also includes, spaced outwardly with respect to lights 30 and at the opposite sides of web 12, pairs of miniaturized high intensity strobe lights 32. The strobe lights 32 may be of similar construction to the light disclosed in co-pending application Ser. No. 487,033, filed Apr. 21, 1983 for "Wide Angle Warning Light" and assigned to the assignee of the present invention. In a typical application there will be a pair of strobe lights housed in both the forwardly and rearwardly facing channels of beam 10 but the spacing between the rearwardly and forwardly facing lights may be different.

The color of the lens element in front of each of the strobe lights may differ from side-to-side and/or from front-to-back. The lens elements on the drivers side of the vehicle may for example be red while the lens elements on the passenger side of the vehicle may for example be blue and these colors may be reversed front to back. A transparent, C-shaped element without optic spreader bands will typically be provided to extend over the frontal area of the lightbar which houses the take-down lights 30. Such a transparent element is indicated at 22' and, as noted above, shown in cross-section in FIG. 4.

A strobe light having a 180 degree radiation pattern in a horizontal plane will be placed adjacent each of the four corners of I-beam 10, a pair of these 180 degree lights being indicated generally at 34. The power supply or power supplies for the strobe lights will also be mounted in the I-beam. A power supply for lights 34 has been indicated at 38 and will be provided with side brackets, as indicted at 40, which are bolted to slide members 41 which engage the upper and lower locating grooves 20 in the I-beam flanges. Motion of the power supply 38 along the channel in which it is housed is prevented by alignment pins which extend from I-beam web 12 and engage and support the power supply. An opaque C-shaped element, as indicated at 42, will typically be provided to cover the power supply or power supplies.

Each end of the lightbar assembly is provided with a molded plastic end cap 44 which, when installed, will abut the ends of the most outwardly located lens elements 22. The end caps 44 also abut the ends of the I-beam 10. A gasket 46 is provided within each end cap for the purpose of establishing a seal between the end cap and the I-beam and also between the end cap and the abutting lens elements 22. The end caps are mounted on the I-beam by means of four thread forming screws 48 which engage the locating grooves 20 in I-beam 10.

As may be seen from FIG. 2A, the web 12 of the I-beam may be notched at the ends so as to provide room for the cable which supplies power for further light sources which are mounted at the ends of the lightbar assembly within the end caps 44. In the disclosed embodiment these further light sources comprise halogen spot light assemblies indicated generally at 49, which include reflectors 50 and an associated mounting bracket 52. The halogen lamps of the light assemblies 49 will be permanently secured within the cooperating reflector 50. Reflector 50 is mounted, by means of screws 51, in bracket 52. Bracket 52 is provided, on its rear side, with slots which receive elongated tabs or flanges 53 of the mounting brackets 94 of the 180 degree strobe lights 34. As will become apparent from the discussion below, the brackets for each of the various light sources of a lightbar assembly in accordance with the preferred embodiment of the invention are mechanically connected to adjacent brackets and these interconnected brackets are affixed to web 12 of I-beam 10 at least at one point. The lights 49, in the disclosed embodiment, function as "alley" lights and thus desirably provide a high intensity beam. Accordingly, if the end caps 44 are, as is the usual case, formed of a colored plastic they are provided with clear "windows" 54. The windows are held in position by means of flexible locking projections which engage the interior of the end cap. Windows 54 may be either "flat" or may include optic spreader bands. An adhesive may also be employed to secure the inserts 54 in position. Gaskets 56 are provided to insure against leakage between the inserts 54 and end cap 44, the gaskets being received in recesses provided in the inwardly facing side of each insert.

In the typical application the "alley" lights at each end of the lightbar may be selectively and separately energized from the vehicle main electrical power supply and the "take-down" lights will be similarly independently operated as a pair. The requisite wiring for all of the spot-type and strobe lights will be routed through the I-beam defined channels.

Figure 5:
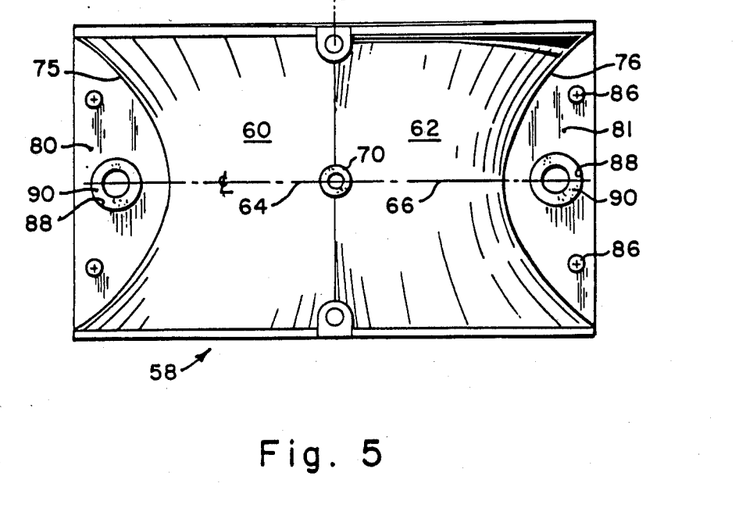
FIG. 5 is a front elevation view of a wide angle light in accordance with the present invention which provides a 180 degree illumination pattern.
Figure 6:
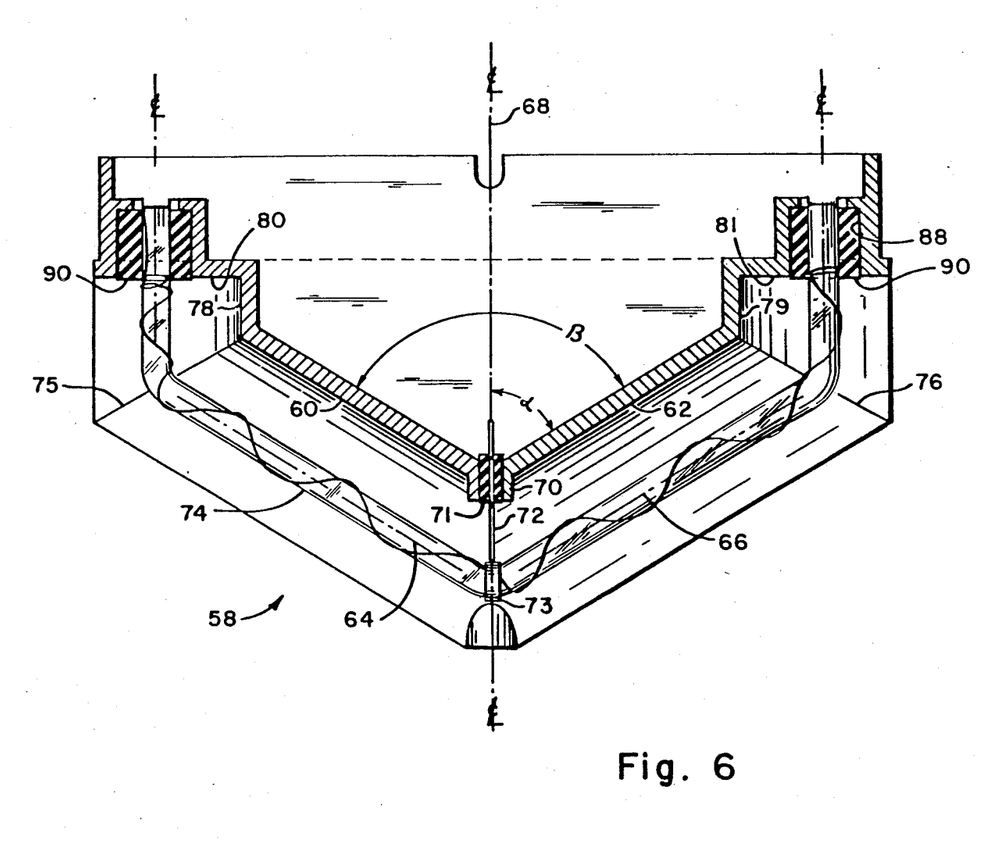
FIG. 6 is a cross-sectional, top-elevation view of the light of FIG. 5.
Figure 7:
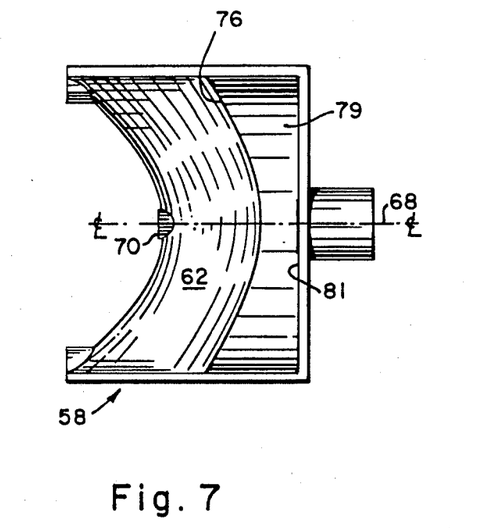
FIG. 7 is a side-elevation view of the reflector portion of the light of FIGS. 5 and 6.
Figure 8:
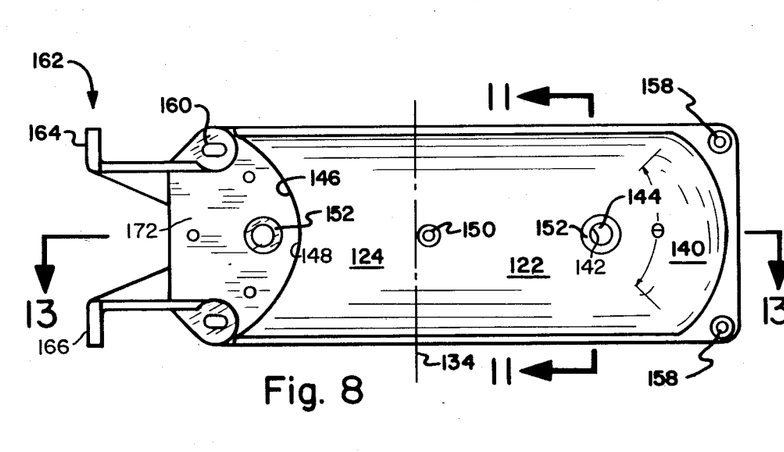
FIG. 8 is a front elevation view of a second embodiment of a wide angle light reflector in accordance with the invention.
Figure 9:
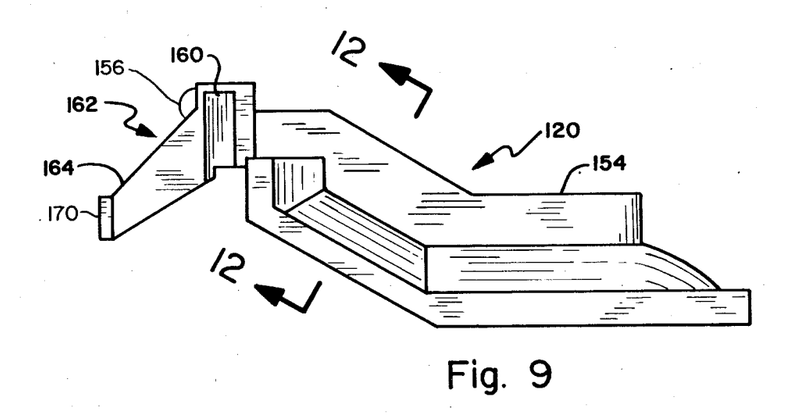
FIG. 9 is a plan view of the reflector shown in FIG. 8.
Figure 10:
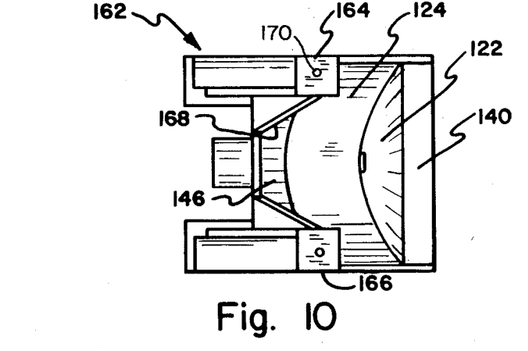
FIG. 10 is an end view, taken from the left, of the reflector shown in FIG. 8.
Figures 11, 12, 13:
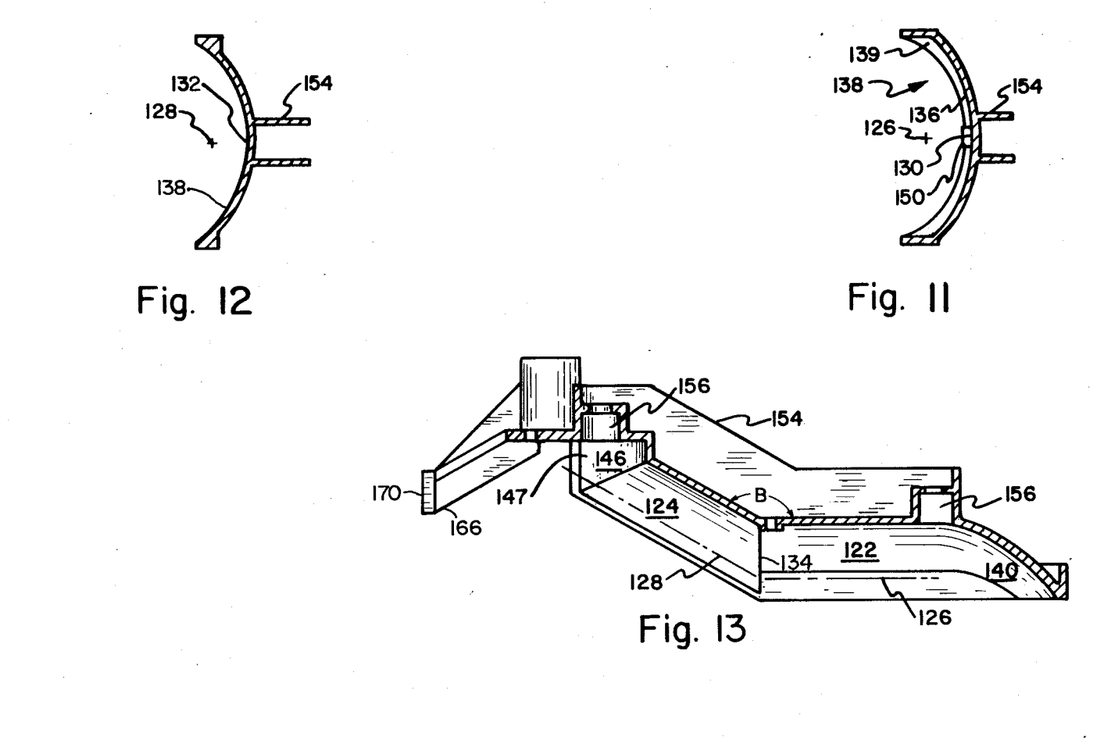
FIG. 11 is a section view taken along line 11—11 of FIG. 8.
FIG. 12 is a section view taken along line 12—12 of FIG. 9.
FIG. 13 is a section view taken along line 13—13 of FIG. 8.

In accordance with a first embodiment of the invention, the 180 degree lights 34 each comprise a unique reflector 58 which may be seen in perspective in FIG. 2 and which is further shown in FIGS. 5–7. The reflector 58 includes a pair of parabolic surfaces 60 and 62 respectively having linear focal points 64 and 66. The vertices of the parabolic reflector surfaces and the focal point lines 64 and 66 which are parallel thereto define a first plane. The vertices of the two parabolic surfaces 60 and 62 intersect at an angle $\beta$ of 120 degrees, i.e., the vertex of each of parabolic reflecting surfaces 60 and 62 intersects the center line 68 of the reflector assembly at an angle $\alpha$ of 60°. A mounting hole, surrounded by a cylindrical projection 70, is provided on the center line of the reflector 58. An insulating grommet 71 is inserted in this mounting hole. A metallic flash tube support 72 extends through grommet 71. A tube ring 73, which may be a part of the tube 74, is connected to the support 72. The ring 73 is also electrically connected to the trigger winding of flash tube 74. As may be seen from FIG. 7, the intersection of the parabolic surfaces 60 and 62 is a parabolic arc through which the center line 68 extends. The opposite ends of reflective surfaces 60 and 62 are cut off along parabolic arcs 75 and 76 and the resulting reflective side surfaces 78 and 79 extend back to flat reflecting surfaces 80 and 81. Surfaces 80 and 81 lie in a plane which is transverse to both the abovementioned first plane, defined by the vertices of the parabolic surfaces 64 and 66 and the parallel lines which include their focal points, and to a second plane perpendicular to the first plane in which the center line 68 lies. The surfaces 78 and 79, which respectively extend between the cut-off arcs 75 and 76 and the flat surfaces 80 and 81 will, at all points, be transverse to respective reflective surfaces 80 and 81 as may be seen from FIG. 6. Reflector 58 will be molded from plastic and will be metallized. The surfaces 80 and 81 are provided with holes 86 for mounting screws and further holes 88, the further holes 88 having their axes lying in the aforementioned first plane. Insulating grommets 90 are inserted in the holes 88.

The anode and cathode of a gas discharge tube 74, typically a flash tube filled with an ionizable gas which will usually include zenon gas, will be supported in respective of grommets 90. Tube 74 will also be supported at its mid-point by ring 73 of support 72. The flash tube 74 is formed such that it will be bent, at its mid-point, whereupon it defines a pair of longitudinal axes which intersect at 120 degrees. The flash tube will be supported so that its axes will, to the extent permitted by manufacturing tolerances, be coincident with the focal points of reflective surfaces 60, 62, 78 and 79. The flash tube 74 will customarily be adhesively secured in place to insure that it remains in the aforementioned position in the interest of maximizing efficiency, i.e., the maximum possible light intensity will be radiated and the radiated light will be spread over an angle of approximately 180°.

The reflector 58 is affixed to the aforementioned mounting bracket 94 by means of mounting screws 96 (FIG. 2B). Bracket 94 has an apertured flat portion 98, to which the reflector 58 is attached, an angled portion 100 which extends outwardly from flat portion 98 toward the open end of the channel in which the reflector is positioned, and a further flat portion 102 which is parallel to portion 98. Flat portion 102 of bracket 94 is of extended width. The above-mentioned tabs 53 extend from the end of flat portion 98 which is opposite to portion 100. The angled portion 100 may be provided with the appropriate surface finish so that it can function as a mirror to enhance the efficiency of the 180 degree lights. The portions of extended width, i.e., the oppositely disposed tabs at the ends of portion 102 of bracket 94, are received in the locating grooves 20 in the top and bottom of the flanges 14 of I-beam 10. Portion 102 of the brackets 94 of the forwardly facing lights are bolted to a bracket 103 to which one of the power supplies 43 for a strobe 32 is also affixed. If the lightbar assembly does not include rearwardly facing strobe lights 32, the portions 102 of the rearwardly disposed 180° lights will be affixed to brackets which are located in grooves 20 and extend to the brackets 40 of power supply 38. The portions 98 of brackets 94 are provided with apertures which are engaged by stand-offs 104 which pass through web 12 of I-beam 10. The stand-offs 104 thus locate brackets 94, and, in so doing, locate the other interconnected brackets in the channels of I-beam 10. The length and angle of portion 100 of bracket 94 is selected so as to locate the reflector 58 in the desired position. This position is typically with the outermost portion of the reflector located adjacent the plane of the edge of the I-beam 10. The height of reflector 58 is such that it will fit between the facing flat surfaces of the thickened outer edge portions of the flanges 14 of I-beam 10 which define the locking grooves 16 and 20.

Figure 1:
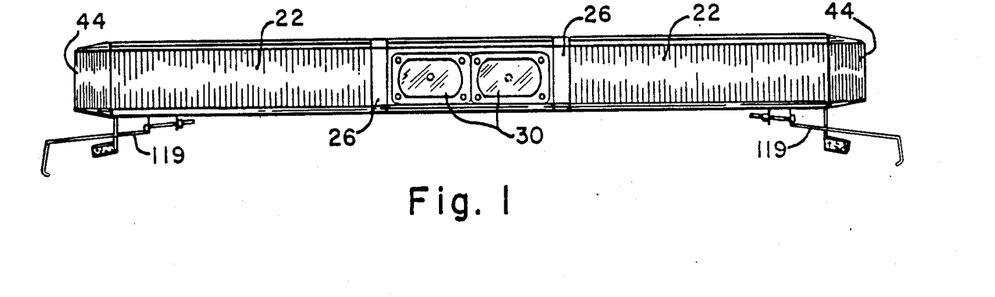
FIG. 1 is a front elevation view of an I-beam supported lightbar assembly.
Figure 3:
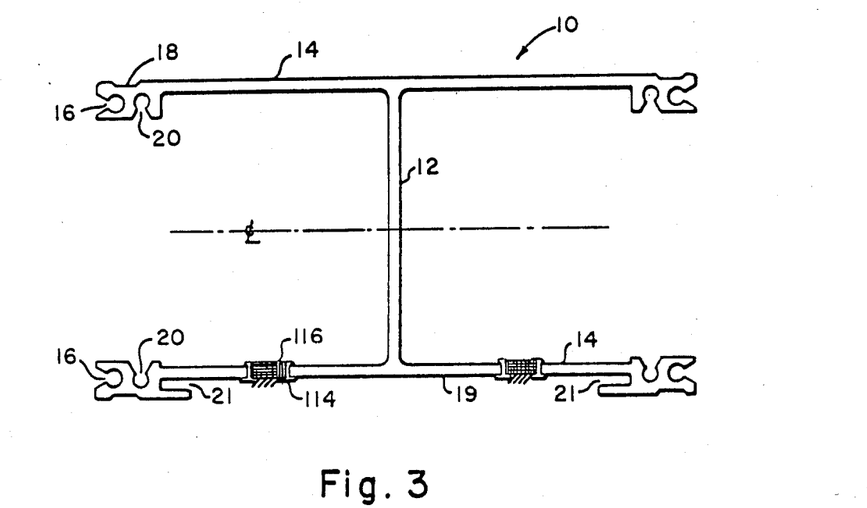
FIG. 3 is a cross-sectional, side-elevation view of the I-beam mounting base of the lightbar assembly of FIG. 1.
Figure 4:
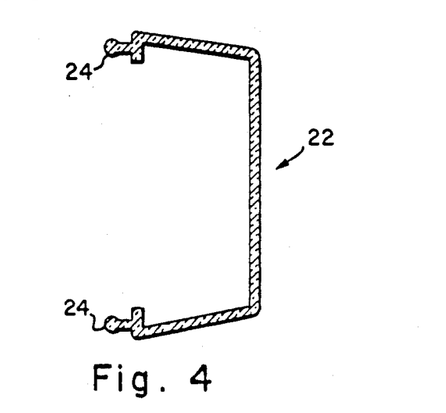
FIG. 4 is a cross-sectional, side-elevation view of one of the lens sections of the lightbar assembly of FIG. 1.

FIGS. 1, 2, and 3 include elements identified by reference numerals 105–119, which form no part of the present invention. These structures relate to the mounting of the lightbar on the vehicle, to the capability of aiming the spotlights 30 and to the drainage of condensate from the light bar. For this reason, no further description thereof is provided herein.

FIGS. 8–13 illustrate a second embodiment of the invention, wherein a wide angle reflector 120 is particularly well-suited for placement on each corner of a lightbar or the like. The reflector of FIGS. 8–13 is a combination reflector in that it serves as a light reflector and as a structural member to support another light.

Corner reflector 120 includes a first parabolic surface 122 and a second parabolic surface 124 (analogous to surfaces 62 and 60, respectively, of the embodiment described in FIGS. 5–7). The corner reflector 120 can be molded from a polycarbonate or equivalent material, with the parabolic reflector surfaces having a vacuum metalized finish. The first parabolic surface 122 has a linear focal point 126, and the second parabolic surface has a linear focal point 128. The curvature of the first and second parabolic surfaces 122, 124 need not be identical, and in the preferred embodiment, for example, the parabolic focal point of the first surface is about 0.69 inch from the first vertex 130, and the focal point 128 for the second parabolic surface 124, is about 0.56 inch from the second vertex 132. The reflecting surfaces are designed to project light in a substantially horizontal plane.

The first and second parabolic surfaces 122, 124 are preferably integrally joined at juncture 134 which, due to the differing parabolic arcs 136, 138, defines a step 139 that has essentially zero depth at the center of curvature, and increases slightly towards the outer edges of the reflector 120.

Although the parabolic focal points 126, 128 may not necessarily be the same distance from the respective vertices 130, 132, both focal points and both vertices lie in the same horizontal plane. The first parabolic surface 122 is intended to direct a light beam in the forward direction and the second parabolic surface 124 is intended to direct the light at a span dispersion angle of about 60° from the juncture 134 towards the other end of the second parabolic surface 124. The included angle $\beta$ is about 150°.

In the preferred embodiment, the corner reflector 120 further includes a third reflecting surface 140 integrally and smoothly formed as an extension of the first parabolic surface 122. The third surface 140 is in the form of a parabolic dish segment having a focal point 142 and a vertex 144 in the same plane as the focal point 126 and vertex 130 of the first parabolic surface 122. The dish surface 140 preferably spans an angle $\theta$ of about 100°. At the end of the second parabolic surface 124 opposite the juncture 134, a fourth parabolic surface 146 is formed, with its focal point 147 and vertex 148 in the same plane as that of the second parabolic surface. The fourth parabolic surface 146 directs light through a span of approximately 30° beyond the span of the second reflector surface 124 and, in particular, this surface directs a portion of the light at a right angle relative to the forward directed light from first parabolic surface 122. As will be described more fully below, when the reflector 120 is mounted in its preferred environment at the corner of a lightbar, the surface 122 directs light forwardly, reflecting surface 146 directs light to the side of the lightbar, and reflecting surfaces 124 and 140 direct light at intermediate angles between the front and side of the light bar.

The details of the placement of a flash tube of the type shown and described with respect to FIG. 6, within the reflector 120 of the present embodiment, are substantially as described hereinabove with respect to the first embodiment. Holes 152 are provided for entry of a single flash tube having a plurality of bends, into the area in front of the reflector, with the centerline of the tube substantially coincident with the focal points of the respective first, second, and fourth reflector surfaces. In the molding process by which the reflector 120 is formed, a hollow rib 154 is preferably included for two purposes. First, it provides rigidity to the reflector, and secondly it provides a trough where cables may be gathered. Hole 150 at approximately the juncture 134, corresponds to hole 71 in the previously described embodiment, whereby a tube support ring (not shown) may be used to support the tube at one of its bends. Mounting holes 158 and 160 are provided to secure the reflector 120 to the I-beam support or other structure which in tur is supported by the I-beam or equivalent lightbar support.

Figure 14:
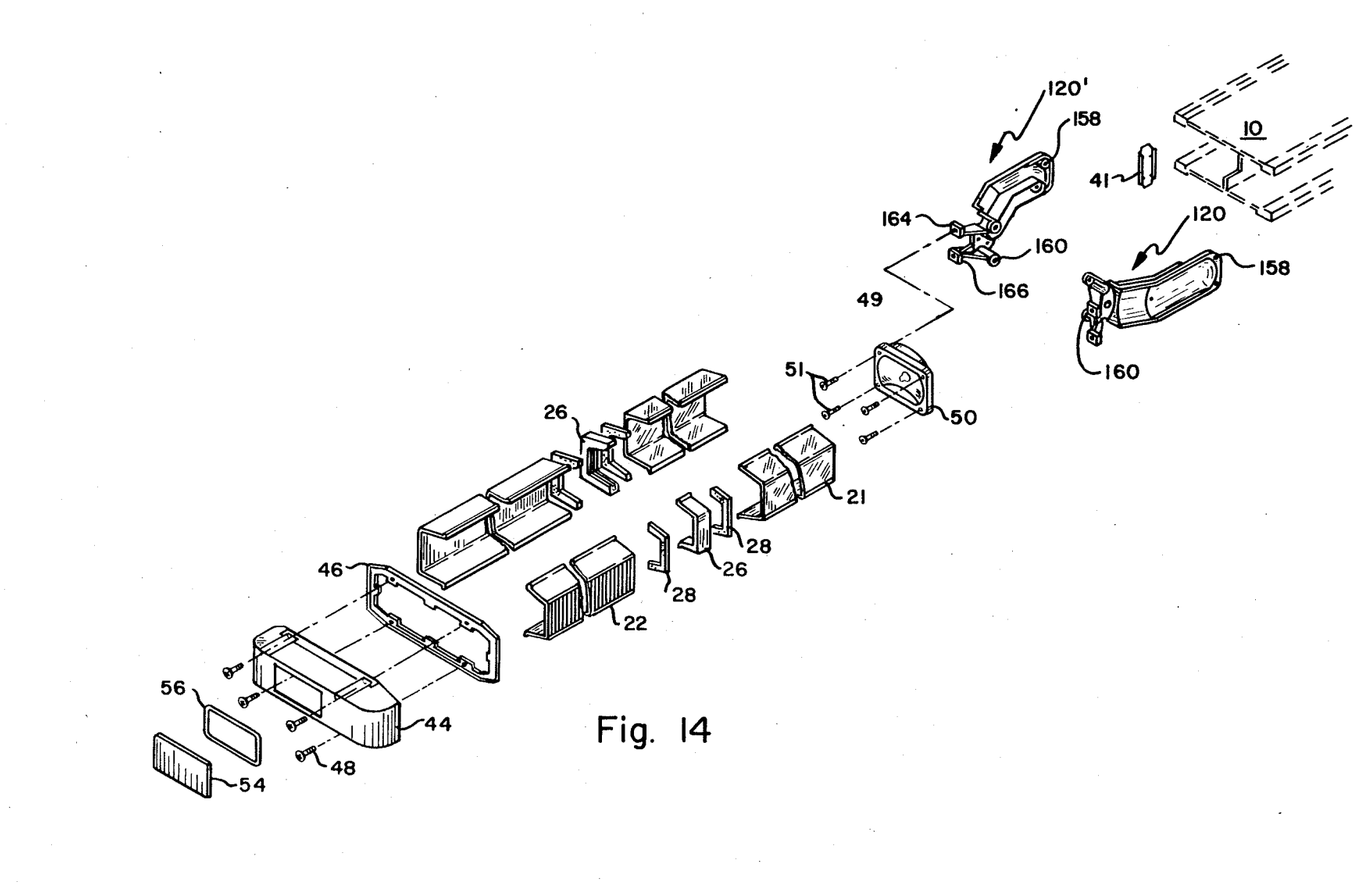
FIG. 14 is an exploded perspective view similar to FIG. 2B showing the second embodiment of the invention for mounting on the corners of the lightbar and including provision for an alley light at the side of the lightbar.

The preferred embodiment of the corner reflector 120 includes an integral bracket 162 that extends generally at right angles to the first reflector surface 122 such that, when the first surface is mounted for directing light forwardly on a lightbar, the integral bracket 162 may support a different kind of light, such as a spotlight, directed to the side of the lightbar. With reference also to FIG. 14, the bracket includes upper and lower arms 164, 166 respectively, that angle outwardly to provide mounting holes 170 for a different light, such as spot or alley light 50 of FIG. 2B. As viewed from the left in FIG. 9, the arms define a cut-out 156 of about 45° wherein the housing of light 50 may fit, and when viewed as in FIG. 10, the arms define a second cutout 168 which permits light reflected from surface 146 to pass through the bracket and impinge upon lens 44, thereby providing a warning light in the side direction, simultaneously with operation of the side spotlight 50. The bracket 162 further includes a body portion 172 in which one of the tube holes 152 is provided and which further includes one set of mounting holes 160.

As shown in FIG. 14, in the preferred embodiment two reflectors 120, 120' are connected at the corners on one side of the I-beam suppport of the light bar. The mounting holes 158 are used to connect one end of each reflector 120 to a respective slide member 41 which is in turn connected to the I-beam 10, and the reflectors 120, 120' are connected to each other through bolt means or the like passing through the mounting holes 160. When fully connected to the I-beam 10 and to each other, the corner reflectors 120, 120' form a composite bracket having four arms 164, 166 aligned for registry with the openings and screws 151 associated with the spotlight 50.

As compared with the embodiment shown in FIG. 2B, the present embodiment substitutes two corner reflectors 120, 120' with their associated flash tubes, for the reflectors 34 and brackets 94, 53, and 52 illustrated in FIG. 14. It should be appreciated that, even when the corner reflectors 120, 120' are connected together in the manner shown in FIG. 14, there is ample room provided in the vicinity of the integral bracket 162 for any required cables to be connected to the spotlight 50, or to the flashtube associated with the corner reflectors 120, 120'. Although the preferred embodiment of corner reflector assembly 120 includes the mounting structure 162 for supporting another light such as spot light 50, this mounting structure is not necessary.

While two embodiments of the wide angle light and their mounting arrangement on a lightbar assembly in accordance with the present invention have been shown and described, various modifications and substitutions may be made thereto without departing from the spirit and scope of the invention. Accordingly, it is to be understood that the present invention has been described by way of illustration and not limitation.

What is claimed:

1. A light having a wide angle radiation pattern comprising:
   a first parabolic reflector, said first reflector including a first reflecting surface having a first linear vertex and having a focal point which extends along a line parallel to the first linear vertex;
   a second parabolic reflector, said second reflector including a second reflecting surface having a second linear vertex and having focal point which extends along a line parallel to said second linear vertex, said first and second reflecting surfaces being integrally joined at first ends thereof such that the vertices of said first and second reflecting surfaces lie on the same plane and intersect at an angle which is greater than 90°;
   a third reflector located at the second end of said first reflecting surface, said third reflector including a third reflecting surface in the form of a parabolic dish segment having a vertex and a focal point substantially in the same plane as the vertex of said first parabolic surface, and forming a smooth, continuous extension thereof;
   light emitter means spanning at least said first and second reflecting surfaces, said emitter means being angled in the vicinity of the first ends of the first and second parabolic surfaces, said emitter means defining axes which intersect at substantially the same angle as the intersection of the reflecting surface vertices; and
   means for supporting said emitter means with its axes positioned generally coincident with the focal points of said first second reflecting surfaces.

2. The light of claim 1 further including a fourth reflector, said fourth reflector including a fourth reflecting parabolic surface located at the second end of the second parabolic surface, said fourth surface having a fourth linear vertex and a focal point substantially in the same plane as the first linear vertex of said first parabolic surface and oriented perpendicularly thereto.

3. The light of claim 2 further comprising a bracket formed at the end of said fourth surface disposed opposite to said second surface, said bracket including a plurality of arms extending generally parallel to the first linear vertex of said first reflecting surface.

4. The light of claim 3, wherein apertures are provided at the second end of said first reflecting surface and in said bracket for the mounting of said emitter means.

5. The light of claim 3, wherein said bracket further includes means for symmetrically connecting the light to a substantially similar light, the arms of the brackets from the connected lights forming means for mounting a light of different construction in an orientation for directing light perpendicularly to the direction of said first reflecting surfaces of said connected lights.

6. The light of claim 5, wherein the vertex of said second reflecting surface is oriented generally at an angle of about 150° relative to the first linear vertex of said first reflecting surface.

7. A light having a wide angle radiation pattern comprising:
   a first parabolic reflector, said first reflector including a first reflecting surface having a first linear vertex and having a focal point which extends along a line parallel to the first linear vertex;
   a second parabolic reflector, said second reflector including a second reflecting surface having a second linear vertex and having a focal point which extends along a line parallel to said second linear vertex, the focal point of said first reflector being farther from its vertex than the focal point of said second reflector is from its vertex, said first and second reflecting surfaces being joined at first ends thereof such that the vertices of said first and second reflecting surfaces lie on the same plane and intersect at an angle which is greater than 90°;
   a light emitter means spanning said first and second reflecting surfaces, said emitter means being angled in the vicinity of the first ends of the first and second parabolic surfaces, said emitter means defining a pair of axes which intersect at substantially the same angle as the intersection of the reflecting surface vertices; and means for supporting said emitter means with its axes positioned generally coincident with the focal points of said reflecting surfaces.

8. The light of claim 7, further including a third reflector located at the second end of said first reflecting surface, said third reflector including a third reflecting surface in the form of a parabolic dish segment having a vertex and a focal point substantially in the same plane as the first linear vertex of said first parabolic surface, and forming a smooth, continuous extension thereof.

9. The light of claim 8 further including a fourth reflector, said fourth reflector including a fourth reflecting parabolic surface located at the second end of the second parabolic surface, said fourth surface having a fourth linear vertex and a focal point substantially in the same plane as the vertex of said first parabolic surface and oriented perpendicular thereto.

10. The light of claim 9, further comprising a bracket formed at the end of said fourth surface disposed opposite said second surface, said bracket including a plurality of arms extending generally parallel to the first linear vertex of said first reflecting surface.

11. A light having a wide angle radiation pattern comprising:

a first parabolic reflector, said first reflector including a first reflecting surface having a first linear vertex and having a focal point which extends along a line parallel to the first linear vertex;

a second parabolic reflector, said second reflector includng a second reflecting surface having a second linear vertex and having a focal point which extends along a line parallel to said second linear vertex, said first and second reflecting surfaces being substantially identical and being joined at first ends thereof such that the first and second linear vertices of said first and second reflecting surface lie on the same plane and intersect at an angle which is greater than 90°;

said first reflector further including a third parabolic reflecting surface having a third linear vertex and having a focal point which extends along a line parallel to the third linear vertex of said third surface;

said second reflector further including a fourth parabolic reflecting surface having a fourth linear vertex and having a focal point which extends along a line parallel to the fourth linear vertex of said fourth surface;

said third reflecting surface being integrally joined at an angle to said first reflecting surface and said fourth reflecting surface being integrally joined at an angle to said second reflecting surface, wherein the first second, third and fourth linear vertices and focal points of the first, second, third and fourth reflecting surfaces all lie in the same plane;

elongated light emitter means spanning said first, second, third, and fourth reflecting surfaces, said light emitter means being angled in the vicinity of the first and second ends of the first and second parabolic surfaces, said light emitter means defining a plurality of axes which intersect at substantially the same angle as the intersection of the reflecting surface vertices; and means for supporting said light emitter means with its axes positioned generally coincident with the focal points of said reflecting surfaces.

12. The light of claim 11, wherein the included angle of the intersection of said first and second reflecting surfaces is about 120°.

13. The light of claim 12, wherein the third and fourth linear vertices of said third and fourth reflecting surfaces are parallel.

14. The light of claim 11 wherein the third and fourth linear vertices of said third and fourth reflecting surfaces are parallel and the light reflected by the third reflecting surface is directed substantially 180° from the light reflected by the fourth reflecting surface.

* * * * *